Patented Nov. 14, 1950

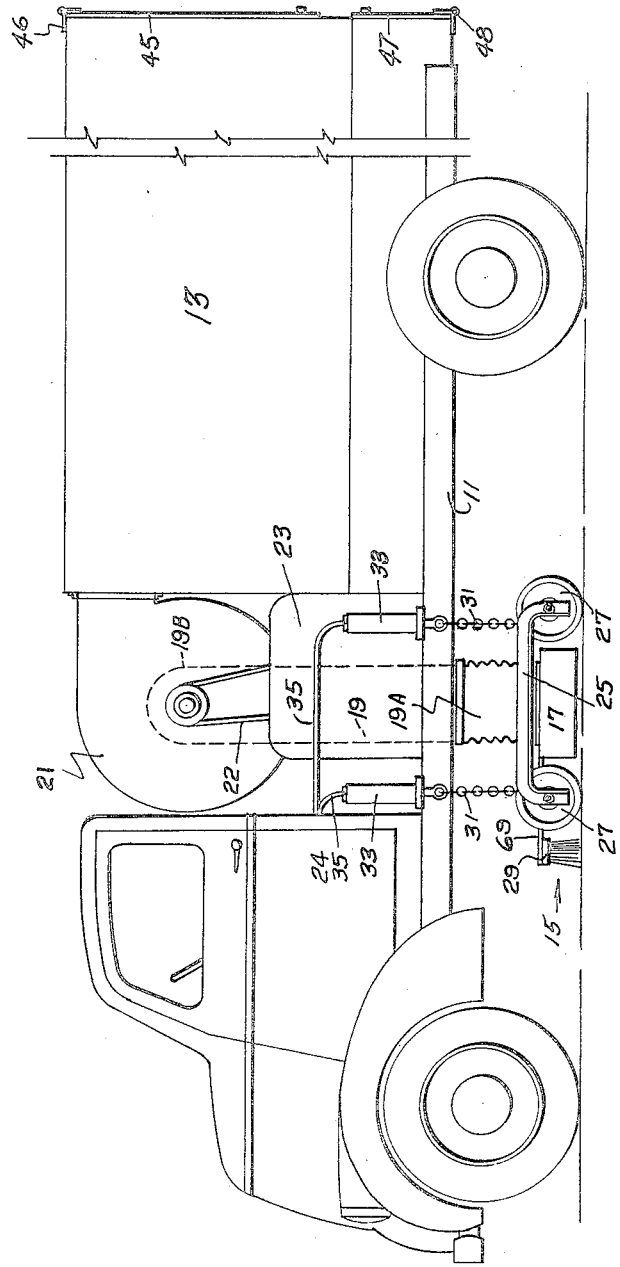

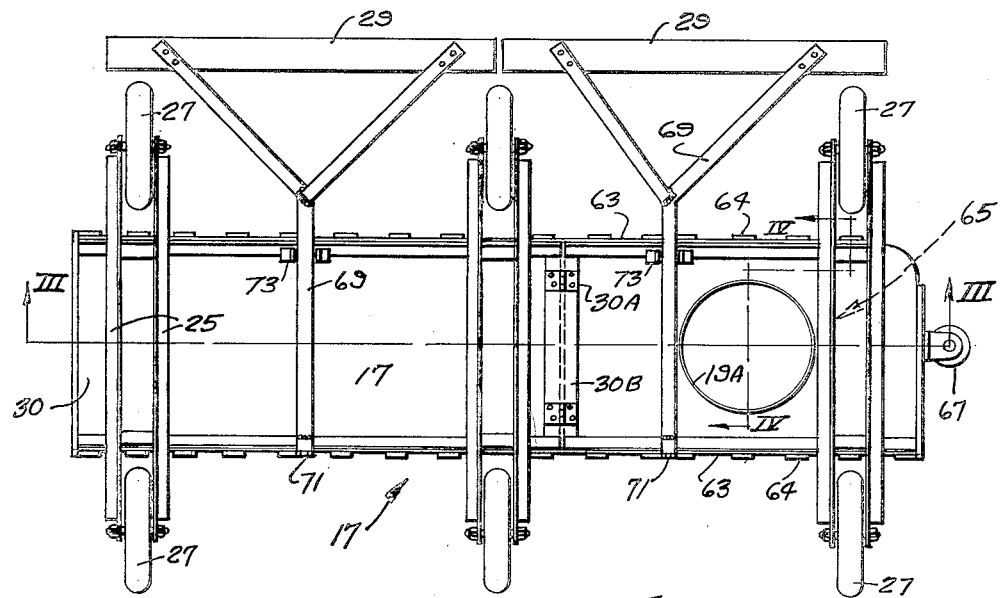
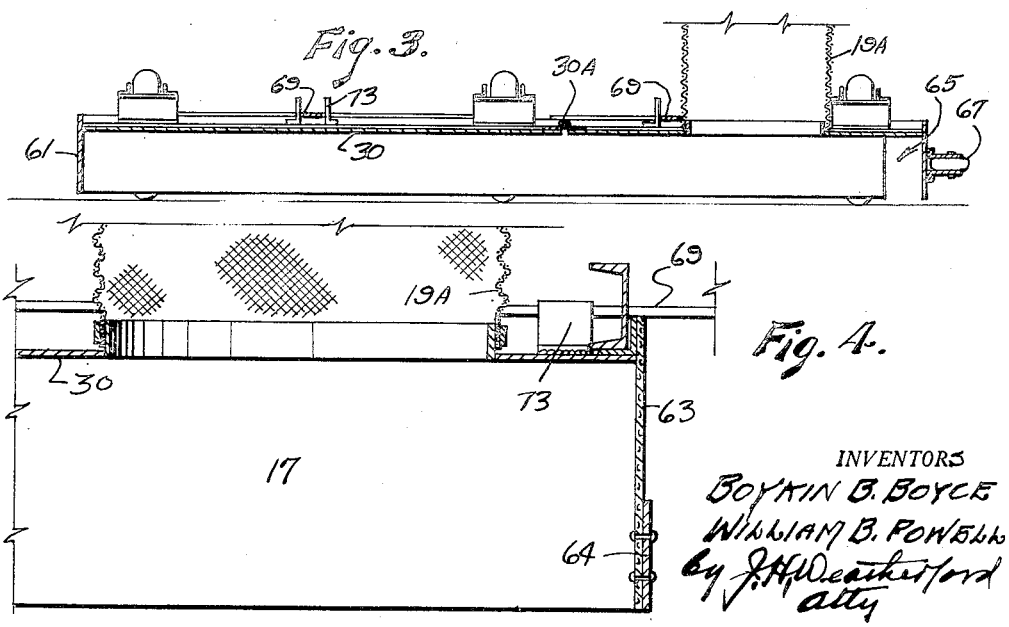

2,529,993

UNITED STATES PATENT OFFICE 2,529,993

SUCTION STREET SWEEPER

Boykin B. Boyce and William B. Powell,
Memphis, Tenn.

Application July 16, 1946, Serial No. 683,861

4 Claims. (Cl. 15—371)

This invention relates to street cleaning machines which sweep the street, pick up the trash and accompanying dirt and dust and load them into a body for disposal. It particularly relates to the sweeping and pickup mechanism.

The objects of the present invention are:

To provide a simple and efficient sweeper unit for a street cleaning machine.

The means by which the foregoing and other objects are accomplished and the manner of their accomplishment will readily be understood from the following specification upon reference to the accompanying drawings, in which:

Fig. 1 is a side elevation of a platform truck with sweeper and pickup mechanisms mounted thereon.

Fig. 2 is a plan view of the sweeper mechanism.

Fig. 3 is a sectional elevation on the line III—III of Fig. 2; and

Fig. 4 an enlarged fragmentary sectional elevation on the line IV—IV of Fig. 2.

Referring now to the drawings in which the various parts are indicated by numerals:

The numeral 11 designates the platform of a motor truck on which a body 13, adapted for the reception of trash and dust, is mounted. Underlying the truck platform is the sweeper unit 15 which includes a transversely mounted collector box 17, from which a suction pipe 19 extends upward to a conventional suction fan 21, which delivers the trash and dust into the body 13. The fan 21 may be driven through a belt 22 by an engine which is mounted on the truck platform and enclosed in a housing 23.

The sweeper unit 15 includes frames 25 in which wheels 27 are journalled. Forwardly of the wheels 27 are brushes 29 and between the wheels and beneath the frames 25 is the collector box 17. The suction pipe 19 is connected with the top plate 30 of the collector box 17 through a flexible or telescoping section 19A to permit raising of the sweeper unit, including the collector box, relatively to the platform 11 of the motor truck, this raising preferably being accomplished as through links 31 by hydraulic cylinder-piston assemblies 33 coupled through pipes 35 to suitable pumping mechanism, such as is now a usual part of truck power plants.

The suction pipe 19 connects, in usual manner, through an elbow 19B into the center of the fan 21. The fan discharges rearwardly into the truck body.

The collector box 17 of the sweeper unit preferably is carried by three wheel-mounted frames, the top plate 30 of the box being in two sections connected by hinges 30A with the joint between the sections sealed by a canvas strip 30B underlying the hinges. At the opposite ends of the plate sections are vertically disposed end plates 61, the right hand end plate 61 extending forwardly from the rear edge of the top plate and terminating short of its front edge. Along the front and back edges of the top plate, curtains 63, as of canvas, depend into similar proximity to the street surface, the front curtain from left to right terminating short of the right hand end of the top plate, leaving an entrance 65 for trash at the front right hand corner of the collection box. The lower edges of the curtains are preferably weighted and stiffened from time to time by plates 64. 67 is a guide wheel adapted to roll along the curb and hold the right hand end of the box from contact with the curb.

The brushes 29 are carried by arms 69 which overlie the top of the box and are connected thereto by hinges 71, preferably at the back edge of the box, allowing upward movement of the brushes independently of the box. 73 are guides at the front of the box which prevent lateral displacement of the arms and brushes carried thereby.

In use, the sweeper is driven along the street, usually the right curb in accordance with other traffic. The brushes 29 sweep the bulkier trash forward and with the help of the street crown, toward the gutter where it enters through the open corner of the collection box. The brushes also scratch and loosen fine trash and dust adhering to the street surface, this material passing under the brushes and front curtain into the box. The fan suction picks up the trash and dust from the box and discharges it rearwardly into the body. At street inlets and other points where excess of trash has accumulated against the inlet grating or curb, progress of the sweeper along the street may be temporarily halted until the accumulation is picked up.

When the body is filled the sweeper unit is raised and the machine driven to the dump.

We claim:

1. In a pick up street sweeper which includes a suction fan; a sweeper unit, including a collection box, and wheeled carriers supporting said box independently of other parts of said sweeper; brush means forward of said box, and a suction pipe connecting said box and said fan; a said collection box which includes a top apertured for connection to said suction pipe and otherwise imperforate; flexible curtains, secured respectively along the front and rear edges of said top and weighted at their lower edges; and end walls respectively depending from the opposite side edges of said top, said curtains and said end walls being supported by said carriers in street surface adjacency but substantially free from contact therewith, the front said curtain and the right hand said end wall respectively terminating substantial amounts short of the front right hand corner of said box to establish an entrance for trash into said box, said top aperture being positioned adjacent the right hand side of said box, whereby brush displaced trash may freely enter said box through said entrance and is induced by said fan to enter, and brush loosened dust is drawn beneath said curtains and ends and both trash and dust are drawn into said fan.

2. In a pick up street sweeper which includes a suction fan; a sweeper unit, including a collection box, means supporting said box independently of other parts of said sweeper, brush means forward of said box, and a suction pipe connecting said box and said fan; a said collection box which includes a top apertured for connection to said suction pipe and otherwise imperforate; flexible curtains, secured respectively along the front and rear edges of said top and weighted at their lower edges; and ends respectively depending from the opposite side edges of said top, said curtains and said ends being supported by said carriers in street surface adjacency but substantially free from contact therewith, the front said curtain and the right hand said end respectively terminating substantial amounts short of the front right hand corner of said box to establish an entrance for trash into said box, said top aperture being positioned adjacent the said right hand corner of said box, whereby brush displaced trash may freely enter said box through said entrance and is induced by said fan to so enter, and brush loosened dust is drawn beneath said curtains and ends and both trash and dust are drawn into said fan.

3. In a pick up street sweeper which includes a suction fan; a sweeper unit, including an elongated collection box, disposed transversely to the direction of movement of said sweeper, and wheeled carriers, contacting the surface of said street, supporting said box independently of other parts of said sweeper; brush means forward of said box, and a suction pipe connecting said box and said fan; a said collection box which includes a top divided transverse to its length into sections, respectively hingedly connected together, said wheeled carriers being disposed respectively adjacent the ends and the said hinge connections of said top, whereby said sections may conform to variations in transverse contour of the street surface; said top being apertured for connection to said suction pipe and said top being otherwise imperforate; flexible curtains, secured respectively along the front and rear edges of said top and weighted at their lower edges; and ends respectively depending from the opposite side edges of said top, said curtains and said ends being supported by said carriers in street surface adjacency but substantially free from contact therewith, the front said curtain and the right hand said end respectively terminating away from the front right hand corner of said box to establish a trash entrance into said box, said top aperture being positioned adjacent the said front right hand corner of said box, whereby brush displaced trash may freely enter said box through said entrance and is induced by said fan to so enter, and brush loosened dust is drawn beneath said curtains and ends and both trash and dust are drawn into said fan.

4. In a pick up street sweeper which includes a suction fan; a sweeper unit, including an elongated collection box, disposed transversely to the direction of movement of said sweeper, wheeled carriers, contacting the surface of said street, supporting said box independently of other parts of said sweeper, a bracket secured to the right hand end of said box and extending therefrom, an a horizontally disposed wheel journalled in said bracket and extending therebeyond and adapted to space the right hand end of said box from a curb of said street, brush means forward of said box, and a suction pipe connecting said box and said fan; a said collection box which includes a top divided transversely to its length into sections, respectively hingedly connected together, said wheeled carriers being disposed respectively adjacent the ends and the said hinge connections of said top, whereby said sections may conform to variations in transverse contour of the street surface; said top being apertured for connection to said suction pipe and said top being otherwise imperforate; flexible curtains, secured respectively along the front and rear edges of said top and weighted at their lower edges; and ends respectively depending from the opposite side edges of said top, said curtains and said ends being supported by said carriers in street surface adjacency but substantially free from contact therewith, the front curtain and the right hand said end respectively terminating away from the front right hand corner of said box to establish a trash entrance into said box, said top aperture being positioned adjacent the right hand side of said box, whereby brush displaced trash may freely enter said box through said entrance and is induced by said fan to so enter, and brush loosened dust is drawn beneath said curtains and ends and both trash and dust are drawn into said fan.

BOYKIN B. BOYCE.
WILLIAM B. POWELL.

REFERENCES CITED

The following references are of record in the file of this patent:

UNITED STATES PATENTS

| Number | Name | Date |
|---|---|---|
| 514,677 | Furnas | Feb. 13, 1894 |
| 943,122 | Pollock | Dec. 14, 1909 |
| 1,229,737 | Furnas | June 12, 1917 |
| 1,253,939 | Clarke | Jan. 15, 1918 |
| 1,301,927 | Frame | Apr. 29, 1919 |
| 1,745,863 | Owen | Feb. 4, 1930 |